(12) United States Patent
Singhal

(10) Patent No.: US 10,802,210 B2
(45) Date of Patent: Oct. 13, 2020

(54) APPARATUS AND METHOD FOR A SAFETY SYSTEM OF CAMERAS FOR ADVANTAGEOUSLY VIEWING VEHICULAR TRAFFIC BY THE DRIVER

(71) Applicant: Tara Chand Singhal, Torrance, CA (US)

(72) Inventor: Tara Chand Singhal, Torrance, CA (US)

( * ) Notice: Subject to any disclaimer, the term of this patent is extended or adjusted under 35 U.S.C. 154(b) by 475 days.

(21) Appl. No.: 15/011,866

(22) Filed: Feb. 1, 2016

(65) Prior Publication Data

US 2016/0229341 A1    Aug. 11, 2016

Related U.S. Application Data

(60) Provisional application No. 62/112,852, filed on Feb. 6, 2015.

(51) Int. Cl.
| | |
|---|---|
| *H04N 7/18* | (2006.01) |
| *G02B 6/02* | (2006.01) |
| *F21V 8/00* | (2006.01) |
| *F21K 9/61* | (2016.01) |
| *B60R 1/00* | (2006.01) |
| *B60R 11/04* | (2006.01) |
| *C03B 37/025* | (2006.01) |
| *C03C 25/105* | (2018.01) |
| *B60R 11/00* | (2006.01) |

(52) U.S. Cl.
CPC ............ *G02B 6/02342* (2013.01); *B60R 1/00* (2013.01); *B60R 11/04* (2013.01); *C03B 37/025* (2013.01); *C03C 25/105* (2013.01); *F21K 9/61* (2016.08); *G02B 6/001* (2013.01); *G02B 6/0006* (2013.01); *G02B 6/02395* (2013.01); *B60R 2011/004* (2013.01); *B60R 2300/105* (2013.01); *B60R 2300/301* (2013.01); *B60R 2300/804* (2013.01); *B60R 2300/8026* (2013.01); *B60R 2300/8066* (2013.01); *C03C 2218/32* (2013.01)

(58) Field of Classification Search
CPC .. G02B 6/001; G02B 6/02342; G02B 6/0006; G02B 6/02395; B60R 1/00; B60R 11/04; B60R 2011/004; B60R 2300/105; B60R 2300/301; B60R 2300/8026; B60R 2300/804; B60R 2300/8066; C03B 37/025; C03C 25/105; C03C 2218/32; F21K 9/61
See application file for complete search history.

(56) References Cited

U.S. PATENT DOCUMENTS 6,429,789 B1 * 8/2002 Kiridena ................ B60R 1/00
                                                340/905
6,529,123 B1 * 3/2003 Paul, Jr. ............. B60R 11/0235
                                                340/425.5

(Continued)

*Primary Examiner* — Peet Dhillon
(74) *Attorney, Agent, or Firm* — Steve Roeder, Esq

(57) ABSTRACT

A system for a motor vehicle for use by a driver of the vehicle to view the surroundings of the vehicle, while driving the vehicle has a system of digital cameras, a computer processor, a memory and a display screen. The processor receives inputs from the system of cameras where the inputs have a sequence of images representing views of surroundings of the vehicle and temporarily saves the images in the memory. The processor processes the series of images to create composite views of the surroundings and displays the composite views on the display screen.

20 Claims, 15 Drawing Sheets

(56) References Cited

U.S. PATENT DOCUMENTS

| | | | | |
|---|---|---|---|---|
| 6,919,917 B1* | 7/2005 | Janssen | ............... | B60Q 9/005 |
| | | | | 348/143 |
| 2002/0005778 A1* | 1/2002 | Breed | ................. | B60Q 9/008 |
| | | | | 340/435 |
| 2008/0204556 A1* | 8/2008 | de Miranda | ......... | B60R 25/102 |
| | | | | 348/148 |
| 2009/0243825 A1* | 10/2009 | Schofield | ............ | B60Q 1/346 |
| | | | | 340/435 |
| 2012/0162427 A1* | 6/2012 | Lynam | ............... | H04N 5/2251 |
| | | | | 348/148 |
| 2014/0267727 A1* | 9/2014 | Alaniz | ................ | H04N 7/183 |
| | | | | 348/148 |
| 2015/0251602 A1* | 9/2015 | Baur | ..................... | B60R 1/00 |
| | | | | 348/148 |
| 2016/0086033 A1* | 3/2016 | Molin | ................ | G06K 9/4652 |
| | | | | 345/419 |

\* cited by examiner

At step 100, mounting a system of digital cameras, with at least two different cameras on the exterior of the vehicle;

At step 102, having a processor and a memory, the processor receiving inputs from the system of cameras, the inputs having a sequence of images representing views of surroundings of the vehicle and temporarily saving the images in the memory;

At step 104, processing by the processor the sequence of images to create and display a sequence of composite images of the surroundings for display on a display screen;

At step 106, receiving by the processor and processing the images at a rate of substantially 24 images per second, providing a real time view of a surroundings of the vehicle on the display screen to the driver in lieu of or in addition to use of glass mirrors.

At step 108, mounting the display screen mounted on one of a group of locations inside the vehicle accessible for viewing by the driver, including (i) the dash board of the vehicle in front of the driver, (ii) middle of the dash board, (iii) left of a rear view mirror, (iv) and optionally in lieu of the rear view mirror.

At step 110, having at least two different cameras in each camera of the system of cameras, providing an overlapping view of a field of view being covered by each camera to eliminate blind spot between the camera views.

FIGURE 7A

At step 112, positioning on the vehicle, each camera of the system of cameras providing a view of spaces and traffic exterior of a left side, a right side of the vehicle and optionally, a rear side of the vehicle.

At step 114, computing by the processor a speed of motion of each vehicle in the sequence of composite view relative to the vehicle;

At step 116, displaying by the composite view other vehicles by placing visual icons on the composite image, enabling the driver to have a situational awareness of the surrounding of the vehicle while the vehicle is In motion or is at rest.

At step 118, orienting the cameras to provide a view of at least two lanes on each side of the vehicle and a view of a distance of 12 cars or 1500 feet to the back of the vehicle.

At step 120, adjusting by the processing the composite image to account for different ambient lights conditions surrounding the vehicle.

At step 122, displaying by the processing each vehicle or object surrounding the vehicle by a size and visual icon.

FIGURE 7B

APPARATUS AND METHOD FOR A SAFETY SYSTEM OF CAMERAS FOR ADVANTAGEOUSLY VIEWING VEHICULAR TRAFFIC BY THE DRIVER

CROSS REFERENCE

This application claims priority from provisional application Ser. No. 62/112,852, filed Feb. 6, 2015, titled "Apparatus and method for a safety system of cameras for advantageously viewing vehicular traffic by the driver" of Tara Chand Singhal.

FIELD OF THE INVENTION

A system of cameras, using cameras positioned on an exterior of an automobile in lieu of a left side, a right side, and rear view glass mirrors, and a display screen positioned on or near the dashboard, provides a three part display for a left side, a right side and center lane views to a driver of the vehicle.

BACKGROUND

A driver of a vehicle, for safe vehicle operation, needs to be aware of vehicle surroundings. This awareness includes, for lane changes and otherwise, using a left-side view mirror mounted on the left-side exterior of the vehicle and a right-side view mirror mounted on the right-side exterior of the vehicle for viewing vehicular traffic. A rear view mirror to view the traffic in the rear of the vehicle that is mounted inside the vehicle may also be used to see the surroundings of the vehicle to the rear of the vehicle.

These glass mirrors may not be entirely satisfactory for a number of reasons, such as, the side view mirrors protrude from the exterior dimension of the vehicle and thus may be unsightly, increase width of the vehicle and thus the passing size of the vehicle, cause drag, as well as the mirrors have blind spots. Therefore, a new solution is required for the driver to be able to have a better or improved situational awareness of the surroundings of the vehicle to be able to safely operate and drive the vehicle then that is provided by the prior art system of glass mirrors.

Therefore, it is an objective of the present embodiments of the invention herein to have a better system of assessing surroundings of the vehicle that is more efficient in its operation and also driver-friendly to assist the driver in safely driving the vehicle. It is another objective to reduce the outer size dimensions of the vehicle by removing exterior mounted glass mirrors, which cause drag and are unsightly in appearance.

SUMMARY

A system of electronic mirrors for a motor vehicle that enable a driver of the vehicle to view the surroundings of the vehicle while driving the vehicle is described. The system of electronic mirrors has a system of digital cameras, with at least two different cameras that are mounted on the exterior of the vehicle.

The system has a processor and a memory and the processor receives inputs from the system of cameras, where the inputs are a sequence of images representing views of surroundings of the vehicle, and temporarily saves the images in the memory.

The processor processes the sequence of images to create and display a sequence of composite images of the surroundings for display on a display screen. The processor receives and processes the images at a rate of substantially 24 images per second that provide a real time view of the surroundings of the vehicle on a display screen to the driver; the display screen is specifically engineered for this purpose, and is used in lieu of, or in addition to use of glass mirrors.

The display screen may preferably be mounted in front of the driver on the dashboard at the bottom of the windshield. The display screen may preferably be mounted in a folded manner and deployed automatically at the time of the vehicle ignition.

These and other aspects of the embodiments herein are further described in detail with the help of the accompanying drawings and the description, where similar numbers are used to identify the features of the embodiments.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIGS. 7A and 7B are method diagram that illustrate features of a preferred embodiment of a camera system for use in a vehicle.

DESCRIPTION

Introduction

Figure 1A:
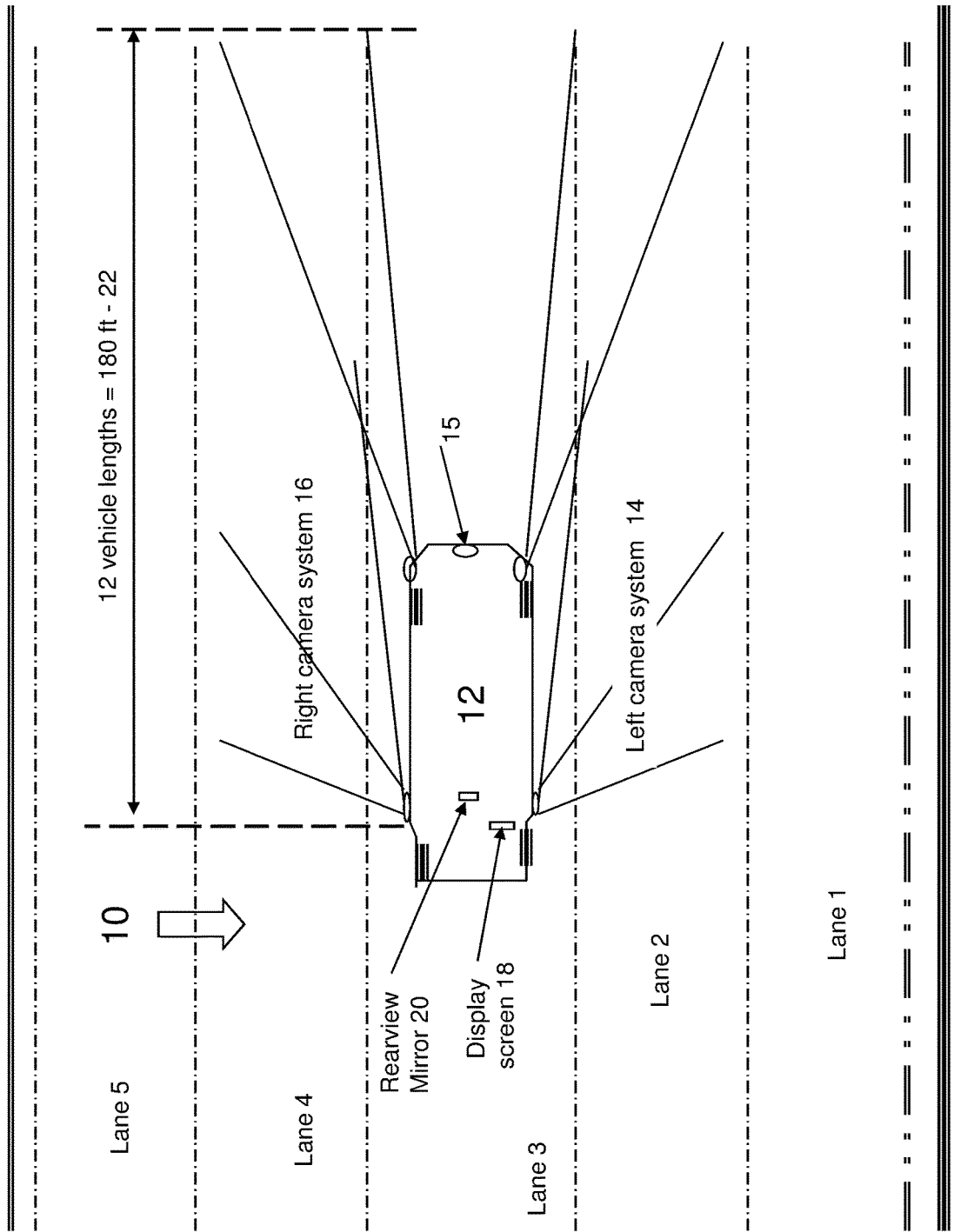
FIGS. 1A, 1B and 1C are block diagrams that illustrate features of the present embodiments of a camera system with a display screen for use in a vehicle.
Figure 1B:
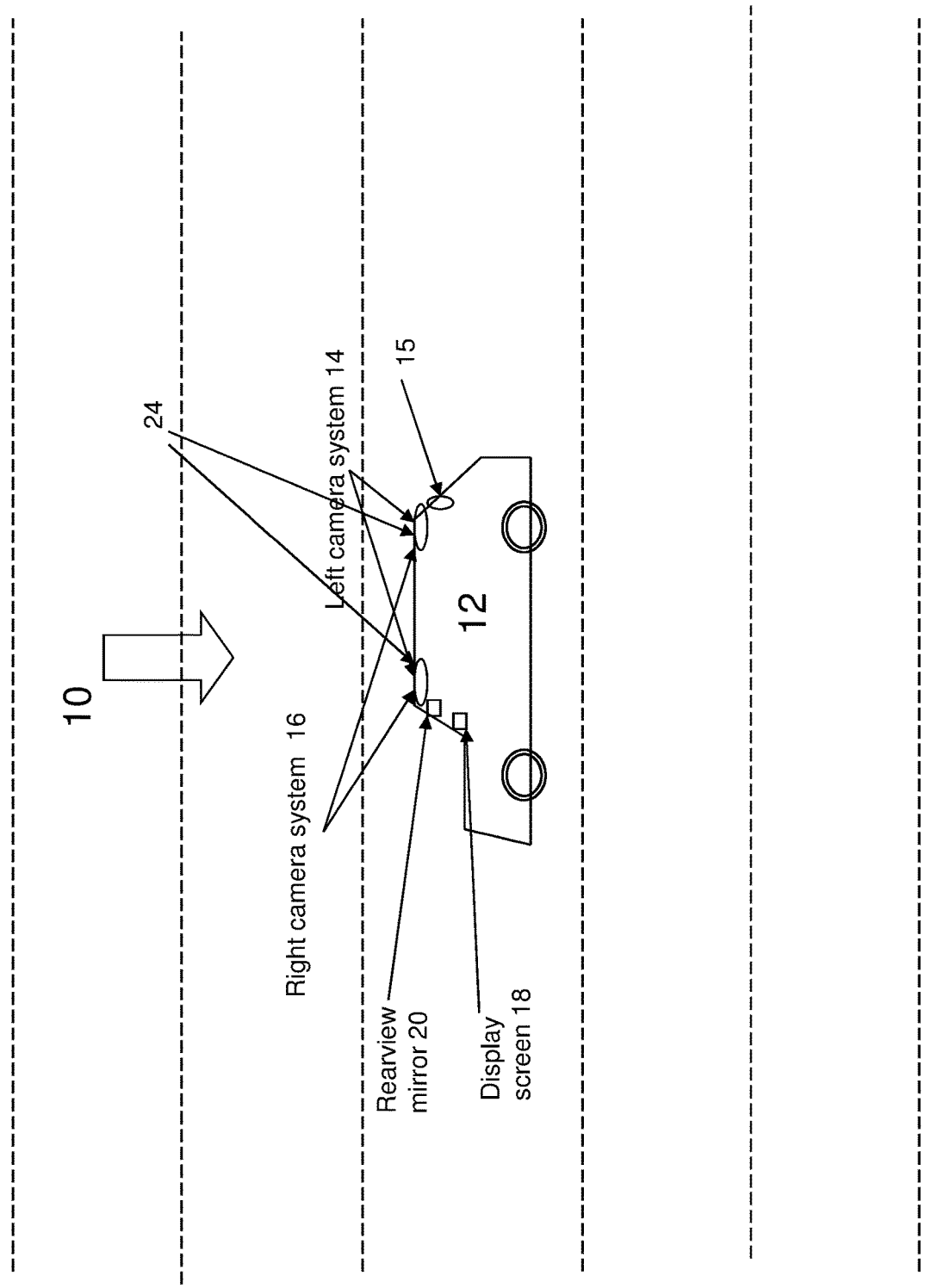
Figure 1C:
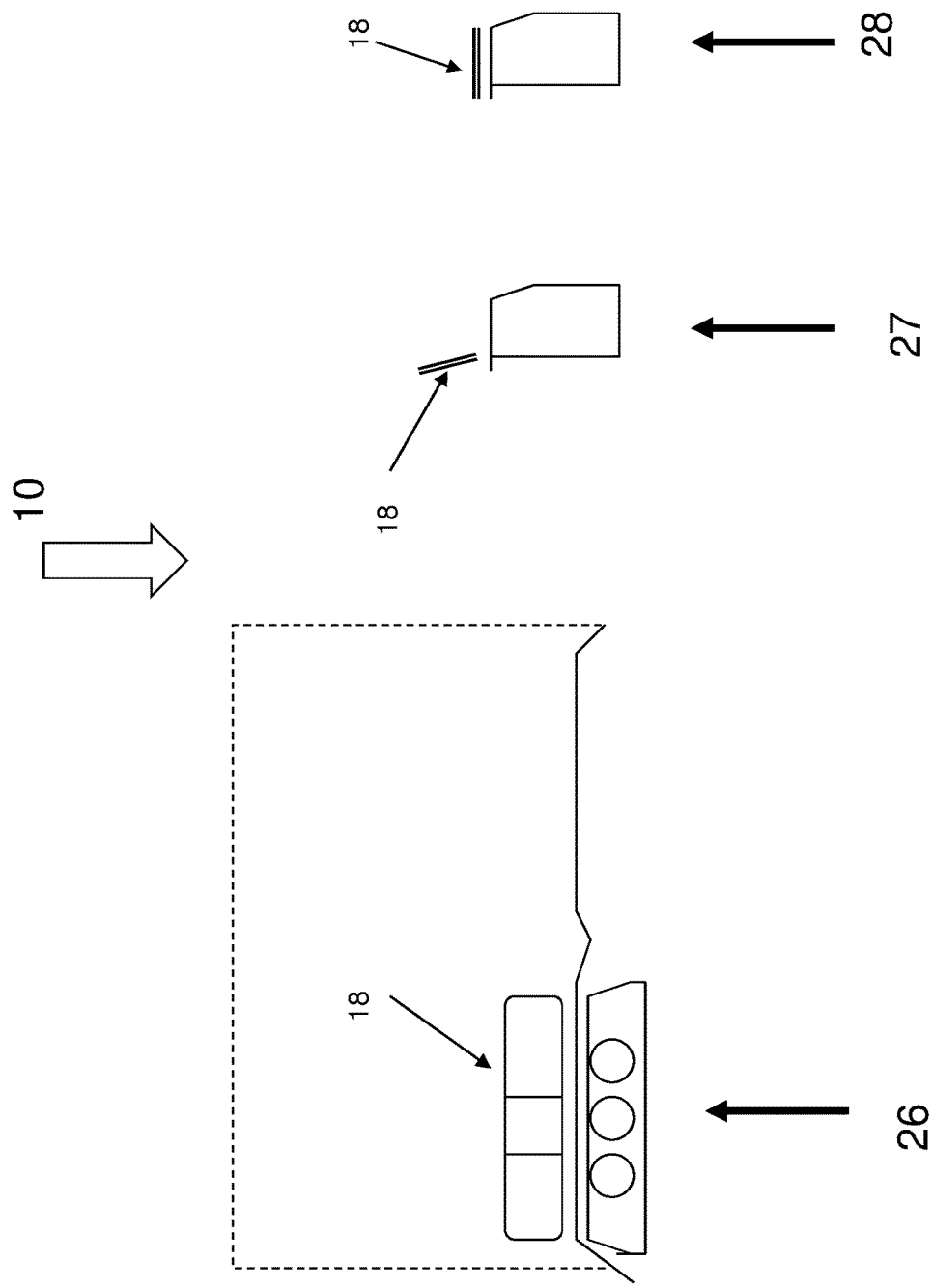

As illustrated with the help of FIGS. 1A, 1B, and 1C, a system 10 is a system of cameras mounted on the exterior of a vehicle 12. The system 10 has a left camera system 14, a right camera system 16 and optionally a center camera 15. The system 10 also has a display screen 18 that is preferably mounted near and in the vicinity of the part of the dashboard that is in front of a driver of the vehicle 12.

As illustrated later with reference to FIGS. 3A, 3B and 3C, the display screen 18 provides a three part display view, where the left part of the screen displays or covers the left side lane of the vehicle; the right part of the screen displays or covers the right side lane of the vehicle and where the center part provides a visual orientation to the driver on the display screen 18 of the left side and right side of vehicle 12 by placing an icon representing the vehicle 12.

The center part of the display screen 18 also optionally displays or covers the rear of the vehicle with the help of camera 15. The vehicle 12 also has a prior art rear view glass mirror 20 that may be used to view the traffic behind the vehicle.

Each system of cameras 14 and 16, on the left side and right side of the vehicle 12 has a group of cameras or multiple cameras that, preferably has three cameras in each group that provide a view for a distance 22 notionally 180 feet to the left and right rear of the driver position in the vehicle 12 for viewing a left lane and a right lane next to the lane in which the vehicle 12 is traveling.

The number of cameras that may be positioned on each side of the vehicle may be more than or less than three. In a preferred embodiment, it is believed three cameras provide a view or coverage of the left lane for a distance that may be advantageous for the driver to be aware of the traffic as far back as approximately one hundred and eighty feet or about 12 car lengths.

In one of these camera groups, two of these three cameras may be mounted near the driver or where the prior art side view mirrors are mounted and the third camera may be mounted on the rear left side of the vehicle. Alternatively all three cameras may be mounted in a single housing in the front half of the vehicle. Further as illustrated in FIG. 1B, the cameras are preferably mounted near the roof line of the vehicle.

Mounting the cameras near the roof line of the vehicle, it is believed, provides a better camera angle to view the surroundings of the vehicle. Further each vehicle is different in height such as, low silhouette sports cars, vans, and SUVs. A system of cameras may be more advantageously positioned near the roof line for different types of vehicles as above. Alternatively the system of cameras may be positioned along other areas of the vehicle and that is not ruled out.

As illustrated with the help of FIG. 1A, the first of these cameras of the left camera group 14 would cover the view immediately to the left of the vehicle and behind the driver seat to a distance of about thirty to forty five feet or about two to three car lengths. Similarly, the second of these cameras would cover the view to the left of the vehicle for additionally about forty five feet to seventy five feet or about three to five car lengths behind the coverage of the first camera. And the third camera would cover the view to the left of the vehicle for additionally about seventy five feet to about one hundred and fifty feet or about five to ten car lengths behind the second camera. Thus, the left side camera system 14 provides view coverage of about one hundred fifty to one hundred eighty feet or about ten to twelve car lengths from the group of three cameras. It is believed such coverage is adequate coverage for a driver to make a decision to make or attempt to make a safe lane change.

The camera angles may be adjusted to provide a view that may be different or more or less than these lengths and distances. There is an overlap between the three camera views to avoid and not have blind spots. The display screen 18 presents a composite view of the three cameras on the left side of the display screen 18. It is believed such a composite view on the display screen 18 has advantages over prior art glass mirrors.

One of these advantages is that the driver does not have to turn his/her head left to view the prior art left side glass mirror. Another advantage is not to have blind spots. Yet another advantage is to have a close-up view of the left side of the vehicle with the help of three different cameras for about one hundred and eighty feet. And yet another advantage is have, with the help of the left and right camera groups and the center camera to have a full view or complete situational awareness of the traffic on all three sides, left, right and rear of the vehicle 12.

Further, the prior art of digital cameras using charge coupled device (CCD) technology provides for a compact and cost efficient camera system that may be advantageously used in the manufacture of system 10. Further such digital cameras that provide digital or pixel based images enable such images to be processed in a computer processor to provide enhanced features and improved images as described later with the help of FIG. 3C.

A digital camera is defined by the focal length of the lens and the pixels in the (CCD). It is believed that a lens with a specification of f 2.0 would be preferred. Other lenses that could be used are a lens of f 1.4 and a lens of f 2.8. A lens with a focal length of f 1.4 is a wide angle lens and a lens with a focal length of f 2.8 is a normal lens.

The pixels that may be used in the digital camera for this application preferably are one mega pixel or more and may be two mega pixel as that it is believed, would create a video image of adequate quality for the intended application and would also be optimum for the required processing for creating a composite image of the three cameras.

Further, digital cameras and their associated computer processing may also provide a close-up view via digital focusing if that would be advantageous to the driver. Further still, the hardware and software technology underlying the compactness and processing power of computer circuitry and memory provided for such images to be received, stored and processed in real time by the computer processor and then be able to provide customized and enhanced view of the surroundings of the vehicle is prior art that has been customized for this specific application.

System 10 thus provides a situational awareness to the driver on a single display screen mounted in front of the driver on the dashboard. Using the space between the windshield and the dashboard for this purpose is a distinct advantage of system 10 over prior art glass mirrors. It is believed, in future, the car designers would adapt the design of the dash board to incorporate the display screen 18 and associated processors.

Further, the cameras of system 10 may be wireless and communicate or send their images wirelessly to the associated processors and memory and thus avoid additional complexity and cost of wiring from the cameras to the associated processors.

Further, the cameras may also receive and send commands and data wirelessly from and to the associated processors. This is useful for diagnostic purposes and for a built-in-test and diagnostic system for system 10 before the system 10 would be used by the driver.

The camera housings may have miniature and hidden antennas to communicate wirelessly with the associated processors. Use of wireless technology for sending camera images to another device is prior art and used in many applications.

Since the camera group 14 and 16 are mounted on the exterior of the vehicle, they are enclosed in a housing that is sealed from the weather elements. Further, the housings are of a shape and design that blends with the exterior of the vehicle. Later it is also described how the issue of fogging of camera lens is handled by a provision of heating.

The orientation of each of the cameras in the camera system 10 may be fixed based on their intended use and application. However, optionally the angle of the camera may be adjusted in up/down and in sideways orientations to further refine the use of camera system 10. This refinement may be for a specific driver and for a specific vehicle. This refinement may also be performed by a car assembly plant to customize to a specific vehicle type when the camera system 10 is OEM installed.

It is possible, that for some or many drivers used to the prior art left and right side glass mirrors, the use of system 10 may be a radically different experience that would require use and experience of the features of the camera system 10. Therefore the vehicle 12 may be equipped with both the prior art left and right side glass mirrors as well as the cameras of system 10. That is, a driver may use either or both the glass mirrors and the camera system 10. There is nothing in the design and features of system 10 that would require removal of the prior art left and right side glass mirrors. The prior art glass mirrors may be folded and deployed when so desired by the driver.

It is likely, as is common in vehicle manufacturing that parts are sourced from different manufacturers based on the specifications provided by a vehicle company. That would be the likely case here and the camera system 10 would be manufactured by a supplier working in conjunction with a vehicle manufacturer.

The display screen 18 of the camera system 10 may also similarly be an OEM part and may be manufactured in different sizes and shapes to suit the interior design of the dashboard of a vehicle. As a simplified illustration, the display screen may have a shape that blends with the contours of the dashboard.

There may be separate computer processors that handle the left side 14 and right side camera group 16 separately. For viable and fail safe operation, there is redundancy in the camera system to provide a fail safe camera system 10.

The technology underlying computer processors, system test, built-in test, redundancy, and diagnostic testing is prior art and widely used in many prior art applications including automobiles. Further, the technology underlying digital cameras, video cameras, infrared cameras and their computer processors, is prior art and widely used in many prior art applications.

The above described mounting and positioning of cameras of the system 10 of the left camera group 14 is equally applicable to the mounting and positioning of cameras for the right camera group 16. Also, it is believed the camera system 10 provides a view of more than one lane on each side of the vehicle 12 and that may be advantageous to the driver in some situations.

Each group or system of cameras on the left and the right side of the vehicle may have three different cameras to provide a view covering a distance 22, where each camera of the group covers a range of distance as illustrated, a view of distance 22 on each sides of the vehicle.

As illustrated in FIG. 1B, the cameras 14, 15, and 16 are mounted on the top part 24 of the vehicle 12 and exterior of the vehicle 12 for these cameras 14, 15 and 16 to be able to provide a comprehensive view of the traffic in at least the lanes 2 and 4 adjacent to the lane 3, in which the vehicle 12 may be traveling in a multi-lane highway that is customary for a highway.

As illustrated in FIG. 1C, views 27 and 28 show a side view and view 26 shows a front view of the display screen 18. As shown in view 26, the screen 18 is mounted on dash board in front of the driver and may be folded as in view 28, and deployed or unfolded as in view 27. The screen 18 may automatically fold and be deployed as in view 27 when the vehicle detects ignition and fold as in view 28 when vehicle ignition is turned off.

Figure 2A:
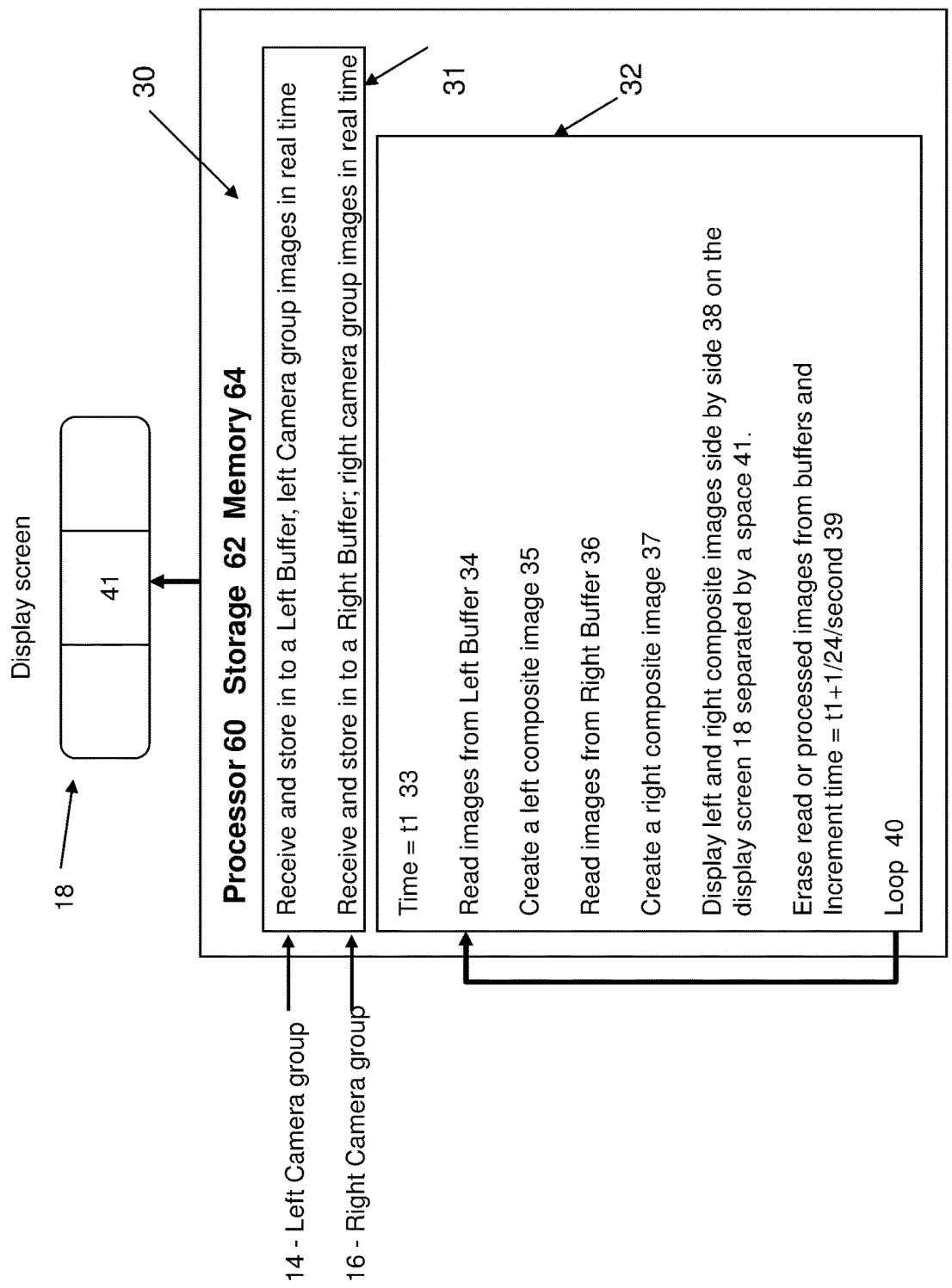
FIGS. 2A and 2B are block diagrams that illustrate functional features of the present embodiments of a camera system for use in a vehicle.
Figure 2B:
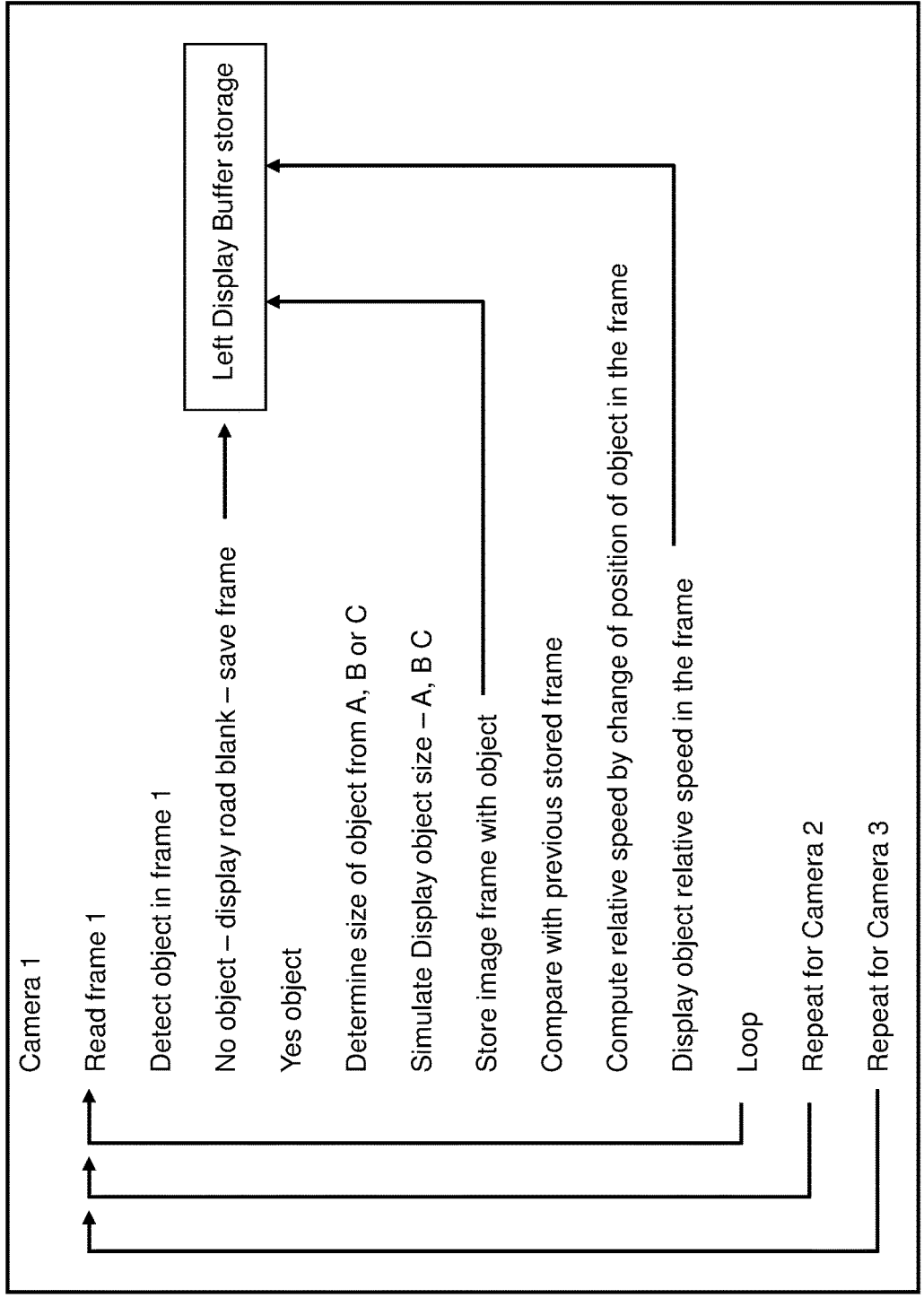

The functions and features of system 10 are further described with the help of FIGS. 2A and 2B which describe the basic operation of the system 10. FIGS. 3A, 3B and 3C illustrate the features and functions of display screen 18.

Figure 4A:
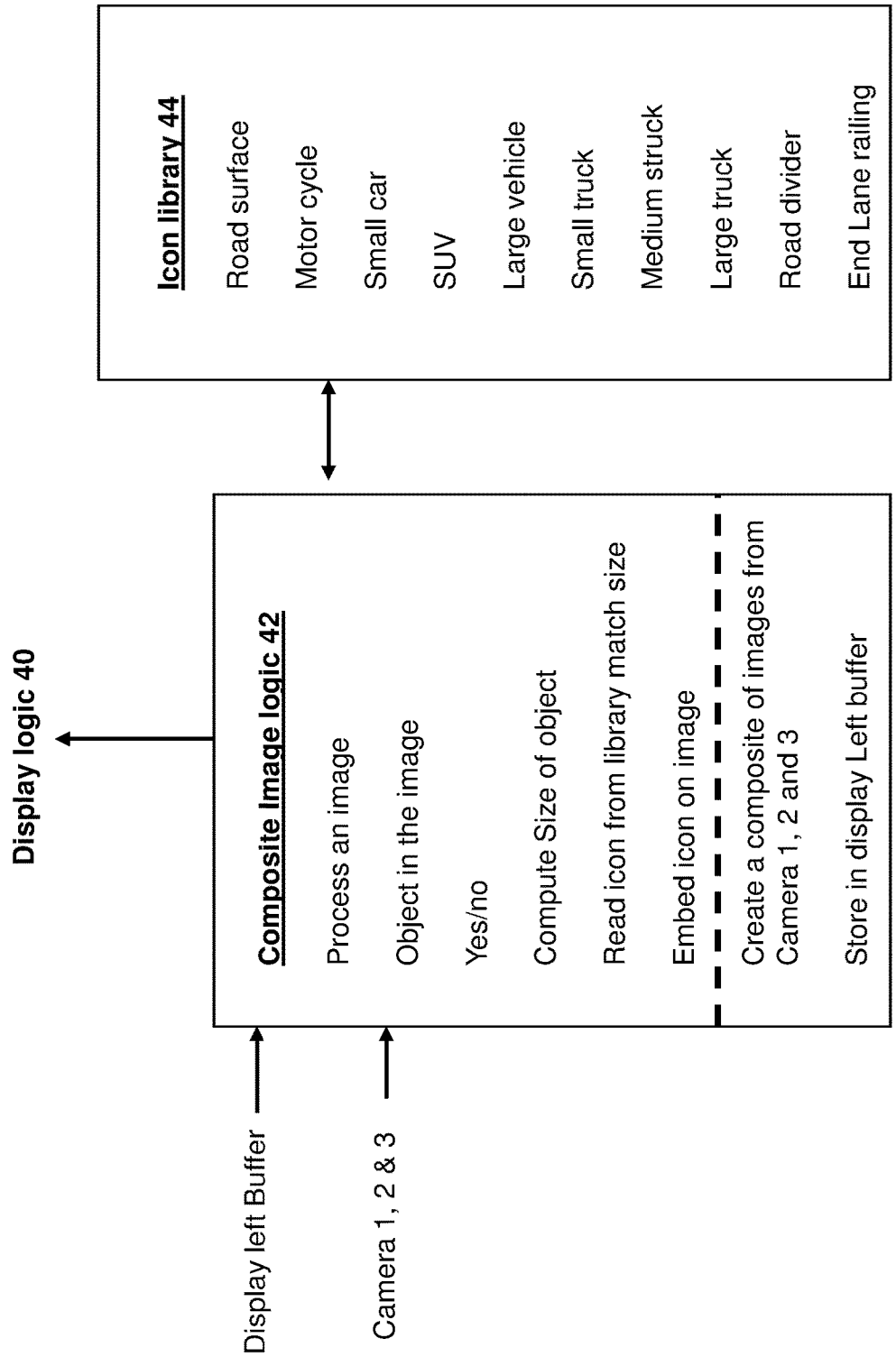
FIGS. 4A and 4B are a block diagram that illustrates features of a preferred embodiment of display logic and composite logic used in the camera system for use in a vehicle.
Figure 4B:
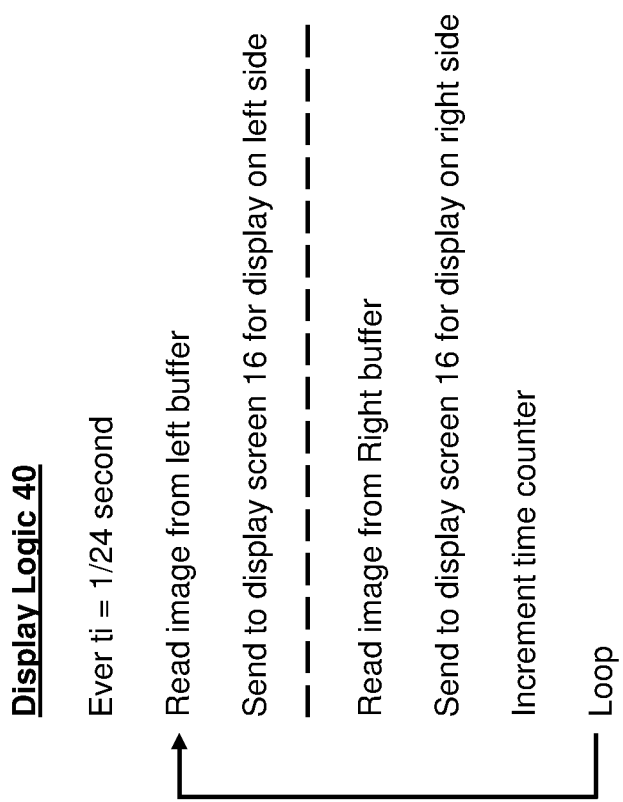
Figure 5A:
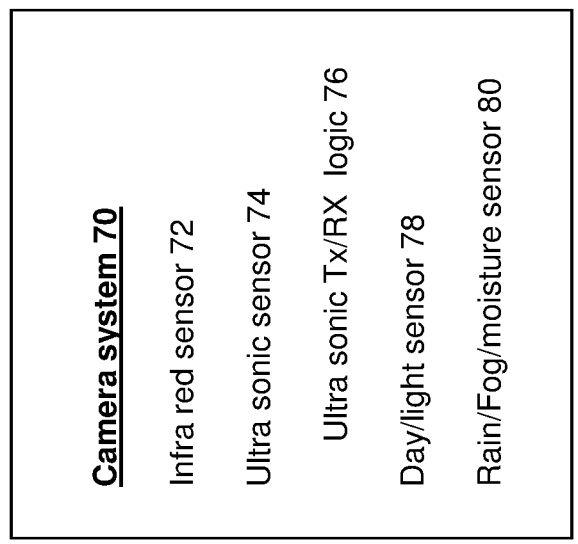
FIGS. 5A and 5B are block diagrams that illustrates features of a camera system for use in the preferred embodiment of a camera system for use in a vehicle.
Figure 5B:
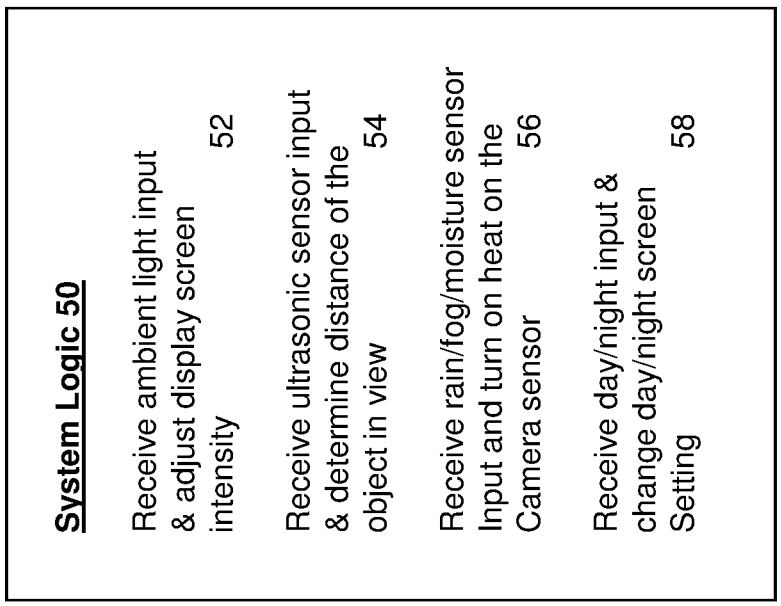
Figure 6:
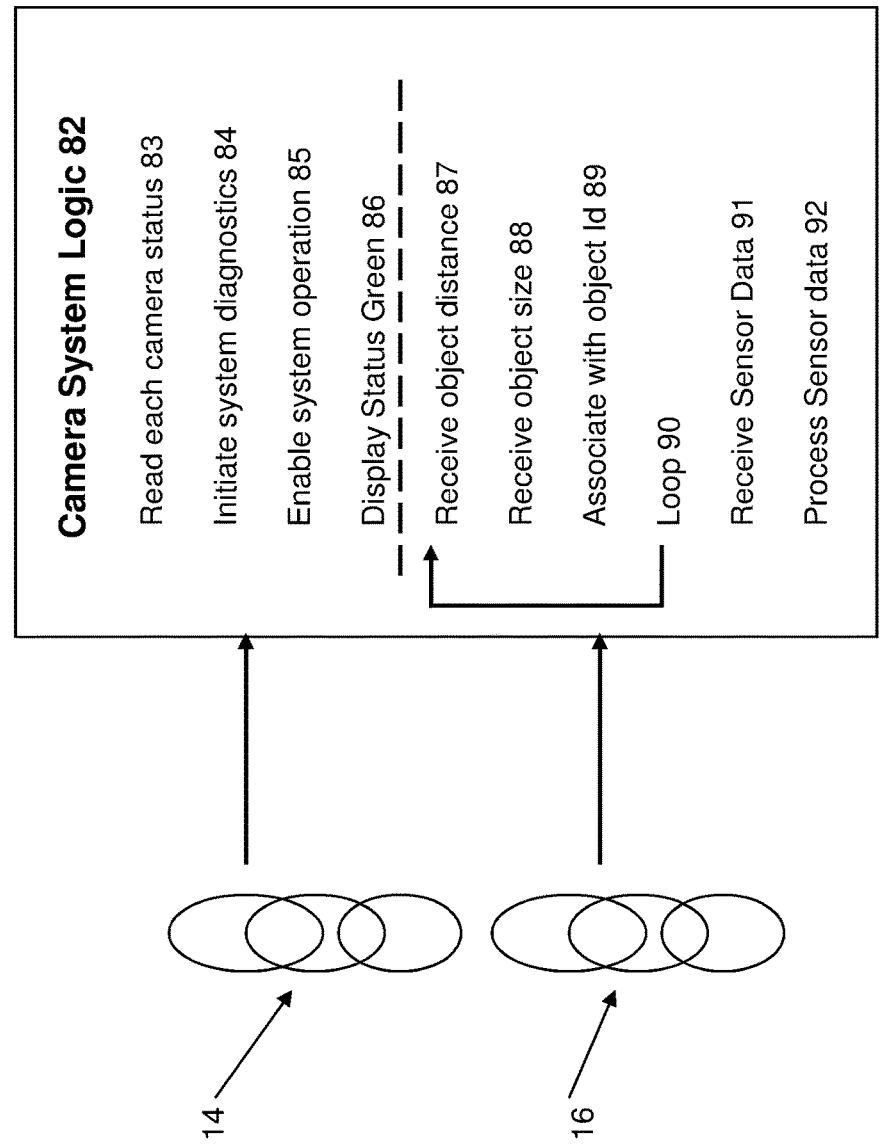
FIG. 6 is a block diagram that illustrates features of a camera system logic of a camera system for use in a vehicle.

FIGS. 4A and 4B illustrate the composite and display logic. FIGS. 5A and 5B illustrate the features and functions of camera system. FIG. 6 illustrate features of the camera logic. FIGS. 7A and 7B illustrate the method features of the system 10. The headings are provided for reader convenience.

Different Embodiments

Figure 3A:
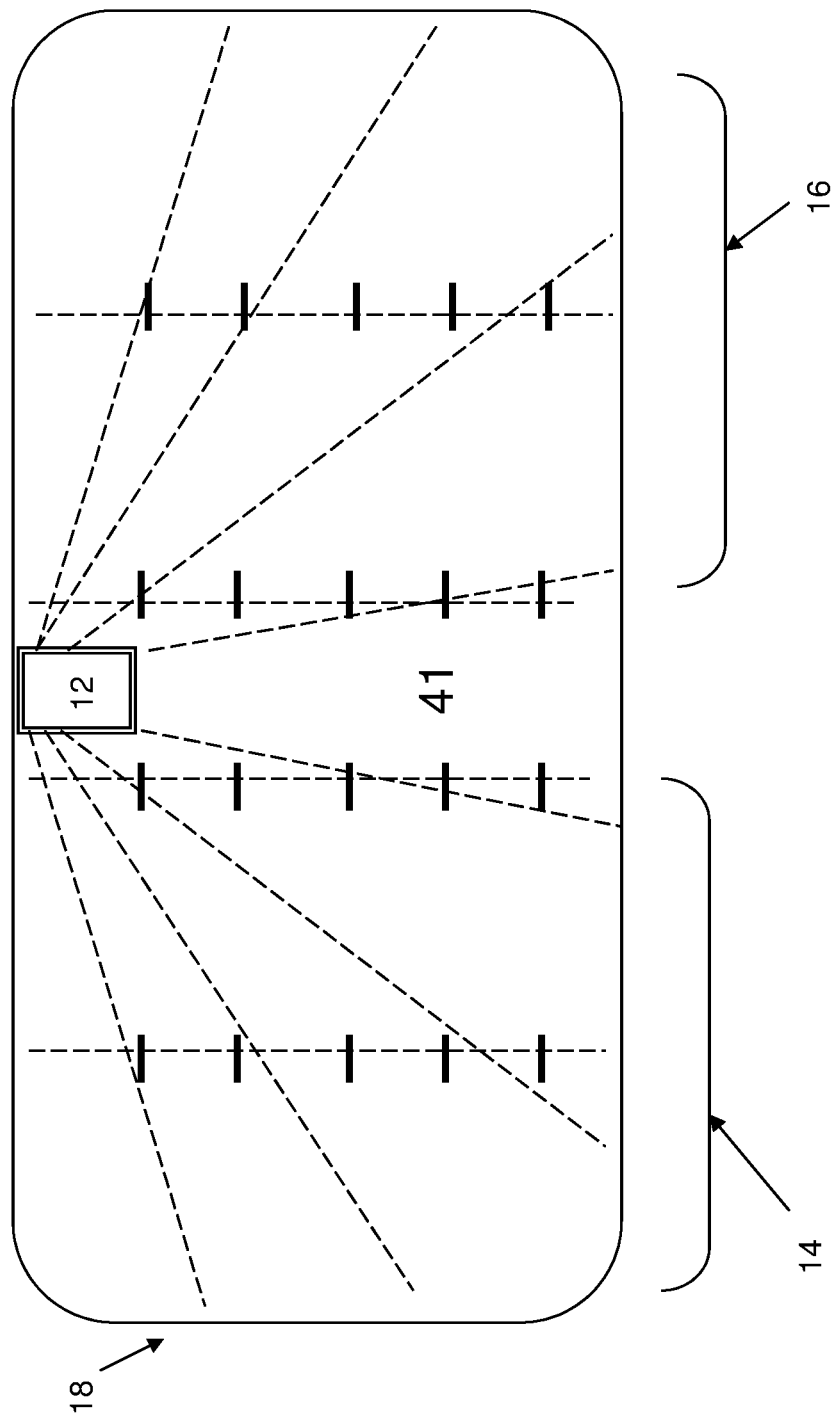
FIGS. 3A, 3B and 3C are block diagrams that illustrates features of the present embodiments of a display screen of a camera system for use in a vehicle.
Figure 3B:
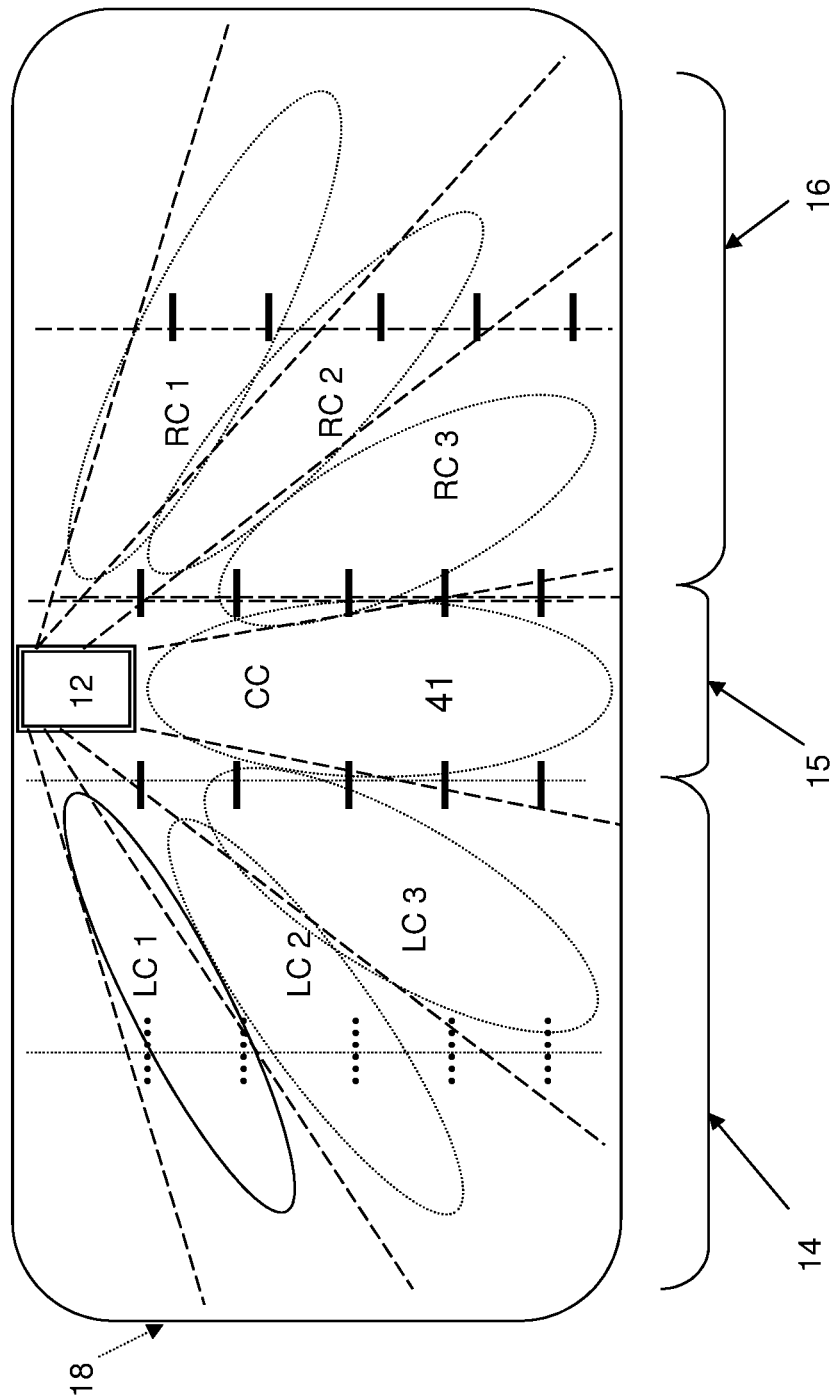
Figure 3C:
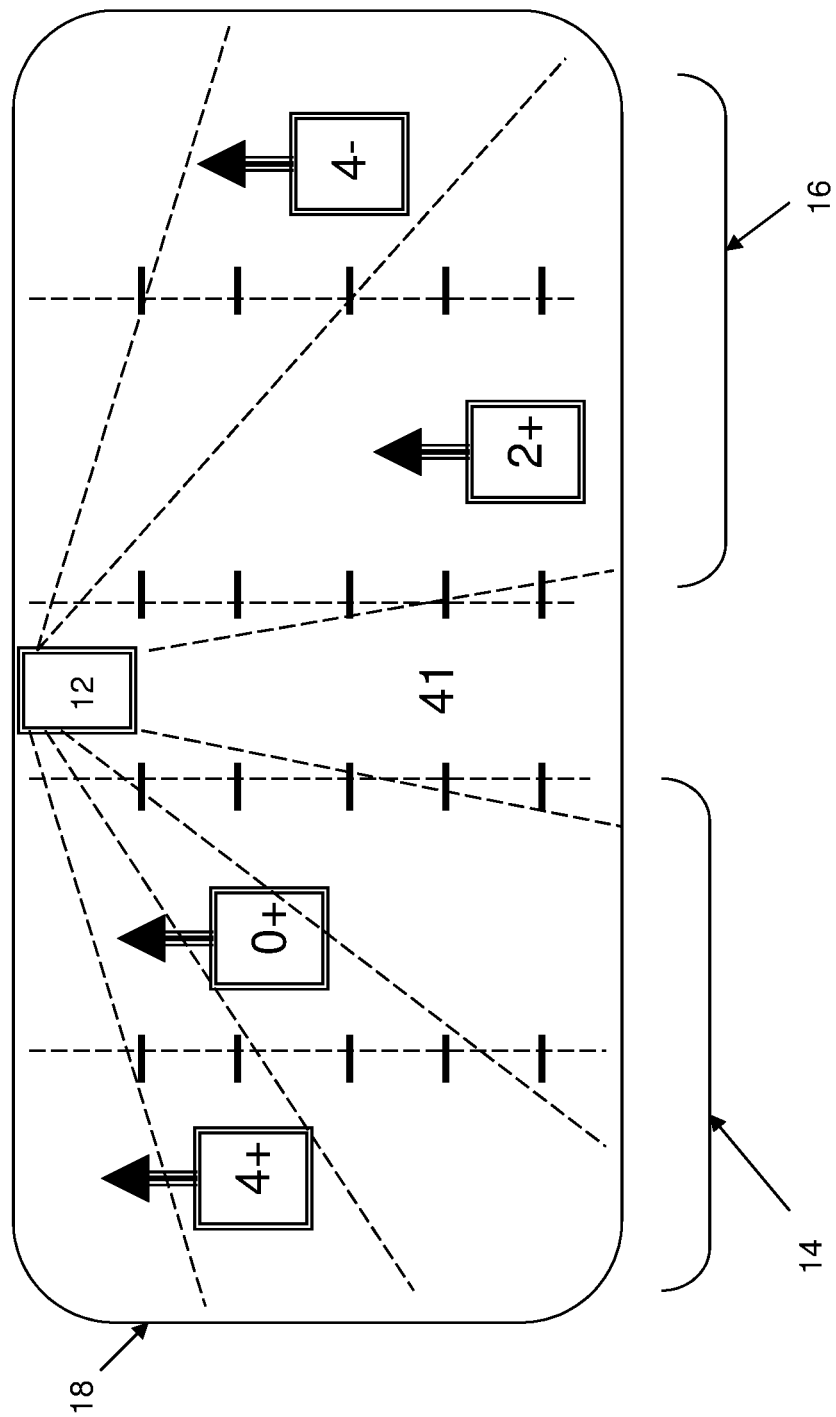

The system 10 may have different embodiments, where in one embodiment, as illustrated with the help of FIGS. 2A and 3A, the view as seen in each camera of the system 14 and 16 is reproduced on the display screen 18, and whereas in another embodiment, as illustrated with the help of FIGS. 2B and 3B, the camera views are processed to remove clutter and as illustrated with the help of FIG. 3C, a composite view shows icons of the vehicular traffic in each lane along with their relative speed that is displayed on the screen 18 in FIG. 3C.

Thus, a driver only needs to see the screen 18, positioned directly in front of the driver on the dash board to be able to discern and view the left side, right side and rear of the vehicle to determine vehicular traffic in these areas to make a lane change, in lieu of glancing at the prior art left side, right side and rear view mirrors.

In another embodiment, the screen 18 displays a representative view by displaying only the vehicle objects by their icons and an empty road surface. In another embodiment the screen 18 also displays the speed and distance of the vehicles in these areas.

In another embodiment, when a driver signals a lane change and or speed change, the system 10 and screen 18 annunciates safety alerts and advisories related to advisability of making such changes.

It is believed, that the system 10 has features and advantages that are not available from the prior art glass mirrors.
System Logic 30

As illustrated with the help of FIGS. 2A and 2B, a simplified illustration of the features and functions 30 of system 10 are further described herein. As illustrated in FIG. 2A, the system 10 has a processor 60, storage 62, and memory 64 that are operative with logic 31 and logic 32. The processor and software technology underlying such features is considered prior art.

In one embodiment, as illustrated in FIG. 2A, logic 31 receives and stores in a left buffer and a right buffer images in real time from the left camera group 14 and the right camera group 16, respectively.

As illustrated in FIG. 2A, the logic 32, sets up a frame sequence timer 33, reads images from left buffer 34 from the three cameras and creates a left composite image 35. Similarly the logic 32 further reads images from right buffer 36 from the three cameras and creates a right composite image 37, and displays left and right composite images side by side on display screen 18 separated by a space 41.

The logic 32 erases 38 these images from the display screen 18 and increment time 39 by ¹⁄₂₄ second and loops 40 to fetch the next sequence of images from the left and right buffer and show the next composite group of images on the display screen 18.

As has been described above, the logic 32 may process and create composite images from the raw images from the left camera system 14 and right camera system 16 on the display screen 18. In an alternative embodiment, as is illustrated with the help of FIG. 2B, the logic 32 may process the raw images to show enhanced images by removing clutter of the background and only display vehicular traffic by vehicle icons.

In another embodiment, FIG. 2B provides a simplified illustration of further features of logic 32 to detect the presence or absence of vehicular objects in the frame. If a vehicular object is detected, the logic 32 further determines the relative speed of the object relative to vehicle 12. The vehicular object along with its relative speed in displayed on the display screen 18 as illustrated in FIG. 3C.

As illustrated in FIG. 2B, each frame is read from the left and right display buffers and processed to determine presence or absence of an object in the form of a vehicle image. If there is no vehicle image detected, a road blank surface is simulated and saved in the frame. There may be vehicle images representing different types of vehicles from large to medium and small vehicles. If a vehicle object is detected, the relative speed of the vehicular object relative to the vehicle 12 is computed. This may be done either by use of the ultrasonic sensor or change in the position of the vehicle object within a single or a series of images.

The logic 32 repeats this procedure simultaneously for each camera of the left camera group 14 and also repeats for the each camera of the right camera group 16. The composite images are saved as replacement images in the left and right display buffers. These features are further illustrated later with reference to FIGS. 4A and 4B.

Display Screen 18

As illustrated with the help of FIGS. 3A, 3B and 3C, the display screen 18 and its features and functions are illustrated. The screen 18 is visually and functionally portioned in three different areas, a left area and a right area separated by a center area 41.

On the left side a composite view from the left system of cameras 14 and on the right side a composite view from right system of cameras 16 is provided. The technology underlying such features is considered prior art.

FIGS. 3A, 3B and 3C illustrate in the center space 41, a simulated view of vehicle 12 and the lane in which it is traveling and the road surface and any objects in that lane using camera 15 mounted in the rear of the vehicle.

FIGS. 3A, 3B and 3C illustrate in the left space, a simulated view of the lanes that are adjacent to the left of the lane in which vehicle 12 is traveling and in the right space a simulated view of the lanes that are adjacent to the right of the lane in which vehicle 12 is traveling.

These lanes also show composite images of the vehicle that may be traveling in these lanes either as captured by the system of cameras or simulated using a library of vehicle icons as illustrated later with reference to FIGS. 4A and 4B.

As illustrated in FIG. 3B, LC1, LC2 and LC3 respectively represents views from the three cameras of left camera group 14 and RC1, RC2 and RC3 respectively represents views from the three cameras of right camera group 16. The view CC is represented by camera 15.

As illustrated in FIG. 3C, the display also shows the relative speed of each vehicle in these lanes relative to vehicle speed. If the vehicle in the adjacent lanes is moving faster than vehicle 12, the relative speed, as a simplified illustration may be shown with a plus symbol indicating to the driver that the vehicle is approaching the vehicle 12.

If the vehicle in the adjacent lanes is moving slower than vehicle 12, the relative speed may be shown as a simplified illustration with a negative symbol indicating to the driver that the vehicle is getting further away from the vehicle 12.

If the vehicle in the adjacent lanes is moving at the same speed as vehicle 12, the relative speed may be shown as a simplified illustration with a zero symbol indicating to the driver that the vehicle is traveling at the same speed as the vehicle 12.

Such speed and distance display of the vehicular traffic in lanes adjacent to vehicle 12 help the driver decide when and if it is safe to make a lane change either to the left lane or the right lane.

In addition logic (not shown) may be used which, which when detects a lane change signal by the driver, based on the speed of the traffic in the lanes would permit a safe lane change and if that is not permitted to create a caution or advisory aural and visual alert for the driver with regards to the advisability of attempting to make the lane change.

The logic would input the parameters of position and relative speed of other traffic and have a threshold of a safe distance for lane change for speed and distance of other vehicles as well as a threshold of reaction time of the driver to make a lane change. As a simplified illustration, if the logic detects a high relative speed or a fast approaching vehicle in the left or the right lane, a caution would be triggered when a lane change signal is detected. Additionally the display would also color code fast approaching vehicles in a color code as would be viewed on the display screen 18.

Composite Logic 42

FIGS. 4A and 4B illustrate a simplified illustration of a composite logic 42, display logic 40 and icon library 44. The icon library 44 provides canned images of representative identification of different types of vehicles that would travel along with the vehicle 12 and would be seen in the left and right side camera groups.

The composite logic 42 analyzes each frame of the camera and determines if a vehicle is present or not and if present what type of vehicle it is. The display logic 40 displays the composite image from the three cameras in the group overlaid with the vehicle icon.

Camera System 70

FIGS. 5A and 5B provides a simplified illustration of the features of the cameras in a camera system 70 and system logic 50 for managing the system of cameras 10 for both the left and right side camera group.

As illustrated with the help of FIG. 5A, the camera system 70 that would be optimum for this application for mounting on the exterior of the vehicle is described.

The camera system 70 preferably uses CCD cameras. The camera system 70 has an infrared sensor camera 72 and logic for determining the presence and size of vehicle objects in the camera view by their heat signature. The infra red sensor camera may also be used for viewing vehicle objects at night time. Such cameras are considered prior art and are used in a variety of applications. The technology underlying such features is also considered prior art.

The camera system 70, optionally has coupled to it an ultrasonic sensor 74 with ultrasonic transmitter and receiver logic 76 for determining and computing the distance of objects in each camera view. The technology underlying such features is considered prior art.

The camera system 70 also has a daylight sensor 78 to determine ambient light and adjusting the intensity of the display on the display screen 18. The technology underlying such features is considered prior art.

The camera system 70 also has a rain/fog/moisture sensor 80 coupled with a heating element to heat the camera lens to remove fog and mist in order and be able to provide a clear view. The technology underlying such features is also considered prior art.

Camera System Logic 50

As illustrated with the help of FIG. 5B, the Camera system 70 has system logic 50 that enables the camera system 70, with functions of: a function 52 to receive ambient light input & adjust display screen intensity; a function 54 to receive ultrasonic sensor input & determine distance of the object in view; a function 56 to receive rain/fog/moisture sensor Input and turn on heat element on the camera sensor; and a function 58 to receive day/night input & change day/night screen setting. The technology underlying such features is considered prior art.

FIG. 6 further provides a simplified illustration of the features of camera system 10, camera groups 14 and 16, and camera system logic 82. The logic 82, reads each camera status 83, initiates system diagnostics 84, enables system operation 85, and displays status indicator as green 86.

Further, the logic 82, receives object distance 87, receives object size 88, associates with an object Id 89 for tracking the object while it is visible in the camera groups and loops 90 for the next frame; receives sensor data 91, and processes sensor data 92. The technology underlying such features of tracking and displaying objects by an object Id is considered prior art.

Mode of Operation

In a simplified and a representative mode of operation, a driver enters a vehicle and turns on the ignition or inserts key before ignition. The screen 18 is deployed and a status indicator green is displayed followed by a display on the screen 18 with three different areas, representing the left and right side views of the vehicle as captured by the left and right side cameras 14 and 16 and separated in the middle by a center view directly rear of the vehicle from a center camera 15.

Thus a driver only needs to see the screen 18, positioned directly in front of the driver on the dash board to be able to discern and view the left side, right side and rear of the vehicle to determine vehicular traffic in these areas to make a lane change, in lieu of glancing at the prior art left side, right side and rear view mirrors.

In another embodiment the screen 18 displays representative views by displaying only the vehicle objects by their icons and an empty road surface. In another embodiment the screen 18 also displays the speed and distance of the vehicles in these areas.

In another embodiment, when a driver signals a lane change and or speed change, the system 10 and screen 18 annunciates safety alerts and advisories related to advisability of making such changes.

It is believed, that the system 10 has features and advantages that are not available from the prior art glass mirrors.

Method of Operation As illustrated in FIGS. 7A and 7B, a method for a camera system 10 for use in a vehicle has the following steps where all the steps may not be used or used in the order specified:

At step 100, mounting a system of digital cameras, with at least two different cameras on the exterior of the vehicle;

At step 102, having a processor and a memory, the processor receiving inputs from the system of cameras, the inputs having a sequence of images representing views of surroundings of the vehicle and temporarily saving the images in the memory;

At step 104, processing by the processor the sequence of images to create and display a sequence of composite images of the surroundings for display on a display screen;

At step 106, receiving by the processor and processing the images at a rate of substantially 24 images per second and providing a real time view of surroundings of the vehicle on the display screen to the driver in lieu of, or in addition to use of glass mirrors.

At step 108, mounting the display screen mounted on one of a group of locations inside the vehicle accessible for viewing by the driver, including (i) the dash board of the vehicle in front of the driver, (ii) middle of the dash board, (iii) left of a rear view mirror, and (iv) optionally in lieu of the rear view mirror.

At step 110, having at least two different cameras in each camera of the system of cameras, and providing an overlapping view of a field of view being covered by each camera to eliminate blind spots between the camera views.

At step 112, positioning on the vehicle, each camera of the system of cameras providing a view of spaces and traffic exterior of a left side, a right side of the vehicle and optionally, a rear side of the vehicle.

At step 114, computing by the processor a speed of motion of each vehicle in the sequence of composite view relative to the vehicle 12 with system 10;

At step 116, displaying in the composite view, other vehicles by placing visual icons on the composite image, enables the driver to have a situational awareness of the surrounding of the vehicle while the vehicle is in motion or is at rest.

At step 118, orienting the cameras to provide a view of at least two lanes on each side of the vehicle and viewing of a distance of 12 cars or 1500 feet to the back of the vehicle.

At step 120, adjusting by the processing, the composite image accounting for different ambient lights conditions surrounding the vehicle.

At step 122, displaying via processing, each vehicle or object surrounding the vehicle, by a visual icon sized to the size of the vehicle or object.

A system for a motor vehicle for use by a driver of the vehicle to view the surroundings of the vehicle, while driving the vehicle has a system of digital cameras, a computer processor, a memory and a display screen. The processor receives inputs from the system of cameras where the inputs have a sequence of images representing views of surroundings of the vehicle and temporarily saves the images in the memory. The processor processes the series of images to create composite views of the surroundings and displays the composite views on the display screen.

The system of cameras has at least two different groups of cameras that are mounted on the exterior of the vehicle. One of the groups of cameras is used to view the traffic in the lanes left side of the vehicle and the other group is used to view the traffic in the lanes right of the vehicle.

The display screen is mounted on the dashboard in front of the driver in a folded or stowed position and is deployed for operation and use when the vehicle ignition is detected.

A system 10 of electronic mirrors for a motor vehicle 12 that enable a driver of the vehicle to view the surroundings of the vehicle, while driving the vehicle, has a system of digital cameras, with at least two different cameras that are mounted on the exterior of the vehicle and a processor and a memory, the processor receives inputs from the system of cameras, the inputs have a sequence of images representing views of surroundings of the vehicle and temporarily saves the images in the memory.

The processor processes the sequence of images to create and display a sequence of composite images of the surroundings for display on a display screen. The processor receives and processes the images at a rate of substantially 24 images per second that provide a real time view of surroundings of the vehicle on the display screen to the driver in lieu of or in addition to use of glass mirrors.

The display screen mounted on one of a group of locations inside the vehicle accessible for viewing by the driver, including (i) the dash board of the vehicle in front of the driver, (ii) middle of the dash board, (iii) left of a rear view mirror, (iv) and optionally in lieu of the rear view mirror. Each camera of the system of cameras, has at least two different cameras, provide an over lapping view of a field of view being covered by each camera to eliminate blind spot between the camera views. Each camera of the system of cameras, positioned on the vehicle provides a view of spaces and traffic exterior of a left side, a right side of the vehicle and optionally, a rear side of the vehicle.

The processor computes a speed of motion of each vehicle in the sequence of composite view relative to the vehicle. The composite view displays other vehicles by placing visual icons on the composite image, enabling the driver to have a situational awareness of the surrounding of the vehicle while the vehicle is In motion or is at rest.

The cameras are oriented to provide a view of at least two lanes on each side of the vehicle and a view of a distance of 12 cars or 1500 feet to the back of the vehicle.

The processing adjusts the composite image to account for different ambient light conditions surrounding the vehicle. The processing displays each vehicle or object surrounding the vehicle by a size and visual icon.

The display show a (i) perspective view as a driver would see, (ii) a plan view, at the option of driver or switch from one to another on a command.

The processor creates an aural and visual alert, when driver signals a lane change, of the safety of the lane change action.

The processor processes the sequence of composite images by removing background in each image and processing the images to determine size and type of each vehicle if any in the images views and searching for an icon for the vehicle from a group of, large vehicle, medium vehicle, a small vehicle, a truck and a motorcycle.

The processor creates a sequence of composite view displays that display other vehicles by placing visual icons on the composite image from the group, enabling the driver to have a situational awareness of the surrounding of the vehicle while the vehicle is in motion or is at rest.

The processor computes a speed of motion of each vehicle in the sequence of composite views relative to the vehicle; and the processor displays the speed of each vehicle by a speed icon next to or on the vehicle icon itself.

In summary, the preferred embodiments are on a system 10 of electronic mirrors for a motor vehicle 12 that enable a driver of the vehicle to view the surroundings of the vehicle, while driving the vehicle.

The system 10 has a system of digital cameras, with at least two different cameras that are mounted on the exterior of the vehicle and a processor and a memory, the processor receives inputs from the system of cameras, the inputs have a sequence of images representing views of surroundings of the vehicle and temporarily saves the images in the memory. The processor processes the sequence of images to create and display a sequence of composite images of the surroundings for display on a display screen. The processor receives and processes the images at a rate of substantially 24 images per second that provide a real time view of surroundings of the vehicle on the display screen to the driver in lieu of or in addition to use of glass mirrors.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A system for a road vehicle for use by a driver of the road vehicle to view traffic in adjacent lanes of the vehicle, while driving the road vehicle, comprising:
   a safety system using a system of cameras in lieu of side view mirrors in the road vehicle, for checking traffic, in adjacent lanes, wherein the safety system includes a display screen positioned inside the road vehicle for viewing traffic in adjacent lanes before making a safe lane change, in lieu of checking the side view mirrors;
   the system of cameras is configured with, a computer processor, a memory and the display screen;
   the computer processor receives inputs from the system of cameras where the inputs have a sequence of images representing views of traffic in adjacent lanes of the road vehicle and temporarily saves the images in the memory;
   the processor processes the sequences of images and creates composite views of the traffic in adjacent lanes, wherein the processor processes a sequence of composite views by removing background images in each view and then processing each view to determine size and type of vehicles, if any in the composite views, and searches for each vehicle a visual icon from a group of icons in the memory and displays the composite views by placing visual icons, thereby enabling the driver to have a situational awareness of the traffic in adjacent lanes of the road vehicle while the road vehicle is in motion or is at rest;
   the processor receives and processes the sequence of images at a rate of substantially 24 images per second that provide a real time view of traffic in adjacent lanes of the road vehicle on the display screen to the driver in lieu of or in addition to use of glass mirrors.

2. The system as in claim 1, comprising:
   (a) the system of cameras has at least two different groups of cameras that are mounted on the exterior of the vehicle;
   (b) one of the groups of cameras is used to view the traffic in the lanes left side of the vehicle and the other group is used to view the traffic in the lanes right of the vehicle.

3. The system as in claim 1, comprising:
   the display screen is mounted on the dashboard in front of the driver in a folded or stowed position and is deployed for operation and use when the vehicle ignition is detected.

4. A system of electronic mirrors for a road vehicle that enable a driver of the road vehicle to view traffic in adjacent lanes of the road vehicle, while driving the road vehicle, comprising:
   a safety system using a system of cameras in lieu of side view mirrors in the road vehicle, for checking traffic, in adjacent lanes, wherein the safety system includes a display screen positioned inside the road vehicle for viewing traffic in adjacent lanes before making a safe lane change, in lieu of checking the side view mirrors;
   the system of cameras, uses, at least two different cameras that are mounted on an exterior of the road vehicle;
   a processor and a memory, the processor receives inputs from the system of cameras, the inputs have a sequence of images representing views of traffic in adjacent lanes of the road vehicle and temporarily saves the images in the memory;

the processor processes the sequence of images to create and display a sequence of composite images of the traffic in adjacent lanes for display on the display screen;

wherein the processor processes the sequence of composite images by removing background images in each composite image and then processing each composite image to determine size and type of vehicles, if any in the composite images, and searches for each vehicle a visual icon from a group of icons in the memory and displays the composite images by placing visual icons, thereby enabling the driver to have a situational awareness of the traffic in adjacent lanes of the road vehicle while the road vehicle is in motion or is at rest;

the processor receives and processes the sequence of images at a rate of substantially 24 images per second that provide a real time view of traffic in adjacent lanes of the road vehicle on the display screen to the driver in lieu of or in addition to use of glass mirrors.

5. The system as in claim 4, further comprising:
the display screen mounted on one of a group of locations inside the vehicle accessible for viewing by the driver, including (i) the dash board of the vehicle in front of the driver, (ii) middle of the dash board, (iii) left of a rear view mirror, (iv) and optionally in lieu of the rear view mirror.

6. The system as in claim 4, further comprising:
each camera of the system of cameras, has at least two different cameras, provide an over lapping view of a field of view being covered by each camera to eliminate blind spot between the camera views.

7. The system as in claim 4, further comprising:
each camera of the system of cameras, positioned on the vehicle provides a view of spaces and traffic exterior of a left side, a right side of the vehicle and optionally, a rear side of the vehicle.

8. The system of claim 4, comprising:
(a) the processor computes a speed of motion of each vehicle in the sequence of composite view relative to the vehicle;
(b) the composite view displays other vehicles by placing visual icons on the composite image, enabling the driver to have a situational awareness of traffic in adjacent lanes of the vehicle while the vehicle is In motion or is at rest.

9. The system as in claim 4, comprising:
the cameras are oriented to provide a view of at least two lanes on each side of the vehicle and a view of a distance of 20 cars or 1000 feet to the back of the vehicle.

10. The system as in claim 4, comprising:
(a) the processing adjusts the composite image to account for different ambient lights conditions surrounding the vehicle;
(b) the processing displays each vehicle or object traffic in adjacent lanes of the vehicle by a size and visual icon.

11. The system as in claim 4, comprising:
the display show a (i) perspective view as a driver would see, (ii) a plan view, at the option of driver or switch from one to another on a command.

12. The system as in claim 4, comprising:
the processor creates an aural and visual alert, when driver signals a lane change, of the safety of the lane change action.

13. The system of claim 4, comprising:
(a) the processor processes the sequence of composite images by removing background in each image and processing the images to determine size and type of each vehicle if any in the images views and searching for an icon for the vehicle from a group of, large vehicle, medium vehicle, a small vehicle, a truck and a motorcycle;
(b) the processor creates a sequence of composite view displays that display other vehicles by placing visual icons on the composite images from the group, enabling the driver to have a situational awareness of the traffic in adjacent lanes of the vehicle while the vehicle is in motion or is at rest.

14. The system of claim 13, comprising:
(a). the processor computes a speed of motion of each vehicle in the sequence of composite view relative to the vehicle; and
(b). the processor displays the speed of each vehicle by a speed icon next to or on the vehicle icon itself.

15. A method for a system of digital cameras for a road vehicle that enable a driver of the road vehicle to view traffic in adjacent lanes of the road vehicle, while driving the road vehicle, comprising steps of:

providing a safety system using the system of digital cameras in lieu of side view mirrors in the road vehicle, for checking traffic, in adjacent lanes, wherein the safety system includes a display screen positioned inside the road vehicle for viewing traffic in adjacent lanes before making a safe lane change, in lieu of checking the side view mirrors;

mounting the system of digital cameras, with at least two different cameras on an exterior of the road vehicle;

having a processor and a memory, the processor receiving inputs from the system of digital cameras, the inputs having a sequence of images representing views of traffic in adjacent lanes of the vehicle and temporarily saving the images in the memory;

processing by the processor the sequence of images to create and display a sequence of composite images of traffic in adjacent lanes for display on the display screen;

wherein the processor processes the sequence of composite images by removing background images in each composite image and then processing the each composite image to determine size and type of vehicles, if any in the composite images, and searches for each vehicle a visual icon from a group of icons in the memory and displays the composite images by placing visual icons, thereby enabling the driver to have a situational awareness of the traffic in adjacent lanes of the road vehicle while the road vehicle is in motion or is at rest;

the processor receives and processes the sequence of images at a rate of substantially 24 images per second that provide a real time view of traffic in adjacent lanes of the road vehicle on the display screen to the driver in lieu of or in addition to use of glass mirrors.

16. The method as in claim 15, further comprising the steps of:
mounting the display screen mounted on one of a group of locations inside the vehicle accessible for viewing by the driver, including (i) the dash board of the vehicle in front of the driver, (ii) middle of the dash board, (iii) left of a rear view mirror, (iv) and optionally in lieu of the rear view mirror.

17. The method as in claim 15, further comprising the steps of:
    having at least two different cameras in each camera of the system of cameras, providing an over lapping view of a field of view being covered by each camera to eliminate blind spot between the camera views.

18. The method as in claim 15, further comprising the steps of:
    positioning on the vehicle, each camera of the system of cameras providing a view of spaces and traffic exterior of a left side, a right side of the vehicle and optionally, a rear side of the vehicle.

19. The method as in claim 15, further comprising the steps of:
    (a) computing by the processor a speed of motion of each vehicle in the sequence of composite view relative to the vehicle;
    (b) displaying by the composite view other vehicles by placing visual icons on the composite image, enabling the driver to have a situational awareness of the traffic in adjacent lanes of the vehicle while the vehicle is In motion or is at rest.

20. The method as in claim 15, further comprising the steps of:
    orienting the cameras to provide a view of at least two lanes on each side of the vehicle and a view of a distance of 20 cars or 1000 feet to the back of the vehicle.

\* \* \* \* \*